(12) United States Patent
Kozlik et al.

(10) Patent No.: US 8,333,369 B2
(45) Date of Patent: Dec. 18, 2012

(54) ALIGNMENT DEVICE AND METHOD FOR APPLYING SLEEVES TO ARROW SHAFTS

(75) Inventors: Christopher A. Kozlik, Schaumburg, IL (US); Karl Muntanion, Schaumburg, IL (US)

(73) Assignee: New Archery Products Corp., Forest Park, IL (US)

( * ) Notice: Subject to any disclaimer, the term of this patent is extended or adjusted under 35 U.S.C. 154(b) by 443 days.

(21) Appl. No.: 12/402,807

(22) Filed: Mar. 12, 2009

(65) Prior Publication Data

US 2010/0230880 A1  Sep. 16, 2010

(51) Int. Cl.
| | |
|---|---|
| B23Q 3/00 | (2006.01) |
| B23Q 1/25 | (2006.01) |
| B25B 1/00 | (2006.01) |
| B25B 1/22 | (2006.01) |
| B25B 27/14 | (2006.01) |
| F41B 5/00 | (2006.01) |

(52) U.S. Cl. ......... 269/9; 269/71; 269/289 R; 269/291; 29/281.1; 124/86

(58) Field of Classification Search ......... 269/9, 71–75, 269/289 R, 291; 29/281.1; 124/86, 25.5, 124/25.6, 23.1
See application file for complete search history.

(56) References Cited

U.S. PATENT DOCUMENTS

| | | | | |
|---|---|---|---|---|
| 421,352 A | * | 2/1890 | De Weese et al. | 211/62 |
| 3,116,730 A | * | 1/1964 | Tingley | 124/24.1 |
| D211,295 S | * | 6/1968 | Wolf | D19/85 |
| 3,888,348 A | * | 6/1975 | Frey | 206/427 |
| 4,204,307 A | | 5/1980 | Pfetzing | |
| 4,239,116 A | * | 12/1980 | Eisenberg et al. | 209/523 |
| 4,312,489 A | * | 1/1982 | Paetzold | 248/97 |
| 4,629,703 A | * | 12/1986 | Uffenheimer | 436/45 |
| 4,738,448 A | * | 4/1988 | Liester | 473/483 |
| 4,972,947 A | * | 11/1990 | McCarthy | 206/214 |
| 5,074,421 A | * | 12/1991 | Coulter | 211/78 |
| 5,265,584 A | * | 11/1993 | Judson et al. | 124/86 |
| 5,443,272 A | * | 8/1995 | Vincent, Sr. | 473/578 |
| 5,524,968 A | * | 6/1996 | Stoltz | 297/344.21 |
| 6,431,162 B1 | * | 8/2002 | Mizek et al. | 124/86 |
| 6,461,002 B1 | * | 10/2002 | Su | 353/119 |
| 6,585,119 B2 | * | 7/2003 | Palder | 211/49.1 |
| 6,666,204 B1 | * | 12/2003 | Hedrick | 124/86 |
| 6,672,299 B2 | * | 1/2004 | Proctor | 124/86 |
| 6,755,310 B1 | * | 6/2004 | Hilton et al. | 211/59.2 |
| 6,901,880 B2 | * | 6/2005 | Hammer | 119/61.57 |
| D510,388 S | * | 10/2005 | Siegel | D19/77 |
| 7,074,143 B2 | * | 7/2006 | Czemske et al. | 473/586 |

(Continued)

OTHER PUBLICATIONS

Co-pending U.S. Appl. No. 12/006,927, Apparatus and Method For Attaching Vane to Shaft, filed Jan. 7, 2008.

(Continued)

*Primary Examiner* — Lee D Wilson
*Assistant Examiner* — Alvin Grant
(74) *Attorney, Agent, or Firm* — Pauley Petersen & Erickson

(57) ABSTRACT

An apparatus and method for holding a plurality of arrow shafts in alignment for applying a heat-shrinkable sleeve thereto. The apparatus includes a support and an arrow holding assembly for holding more than one arrow shaft relative to the support. An adjuster ring is moveable along the support to hold the sleeves in the desired positions on the shafts. The apparatus and method of this invention allows for consistent positioning of shrinkable sleeves around multiple arrow shafts and simultaneous shrinking of sleeves onto the multiple arrow shafts.

21 Claims, 3 Drawing Sheets

U.S. PATENT DOCUMENTS

| | | | | |
|---|---|---|---|---|
| D543,803 S * | 6/2007 | Henderson et al. | ............ | D7/707 |
| 7,311,097 B1 * | 12/2007 | Callis | ............................ | 124/23.1 |
| 7,685,689 B1 * | 3/2010 | Del Castello | ................ | 29/281.1 |
| 7,748,545 B2 * | 7/2010 | Johnson | ........................... | 211/78 |
| 2007/0068873 A1 * | 3/2007 | Oroskar et al. | ................ | 210/659 |
| 2010/0000980 A1 * | 1/2010 | Popescu | ........................ | 219/201 |

OTHER PUBLICATIONS

Bohning Archery Catalog, 2009, published before Mar. 12, 2009 (23 pages).

Rouge, Dave, U.S. Provisional Patent Applicaiton entitled: Arrow Fletch Device, U.S. Appl. No. 60/533,039 (4 pages).

http://www.arrowwraps.com, Bay Wholesalers, Preston Performance—Graphics n Sign—printed on Jul. 12, 2004 (2 pages).

http://www.decalnetwork.com/awinstall.htm, Bay Wholesalers, Preston Performance—Graphics n Sign—printed on Jul. 12, 2004 (1 page).

http://www.extremearchery.com/shrink_fletch.html, Extreme Archery Products, "Shrink-Fletch," published Mar. 27, 2005 (2 pages) and pictured contents of "Shrink Fletch" package, (1 page).

Shootingmasters, Arrow-Skin™ Packaging Insert (3 pages) available prior to Jan. 7, 2007.

http://www.shootingmasters.com, Shootingmasters, "About Arrow-Skin™," internet information page, Copyright © 2001 (1 page).

http://www.shootingmasters.com, Shootingmaster, "Installing Arrow-Skins™," internet instruction page, Copyright © 2001 (2 pages).

http://wwwshootingmasters.com, Shootingmasters, "On-Line Arrow-Skin Ordering," internet order form page, Copyright © 2004 (2 pages).

http://www.shootingmasters.com, Shootingmasters, "Arrow-Skin™ Home page," Copyright © 2001 (1 page).

http://www.shootingmasters.com, Shootingmasters, "Arrow-Skin™ Tips," Copyright © 2001 (1 page).

https://www.shootingmasters.com, Shootingmasters, Arrow-Skin™ "Photo Image page" and photo enlargement, Copyright © 2001 (2 pages).

* cited by examiner

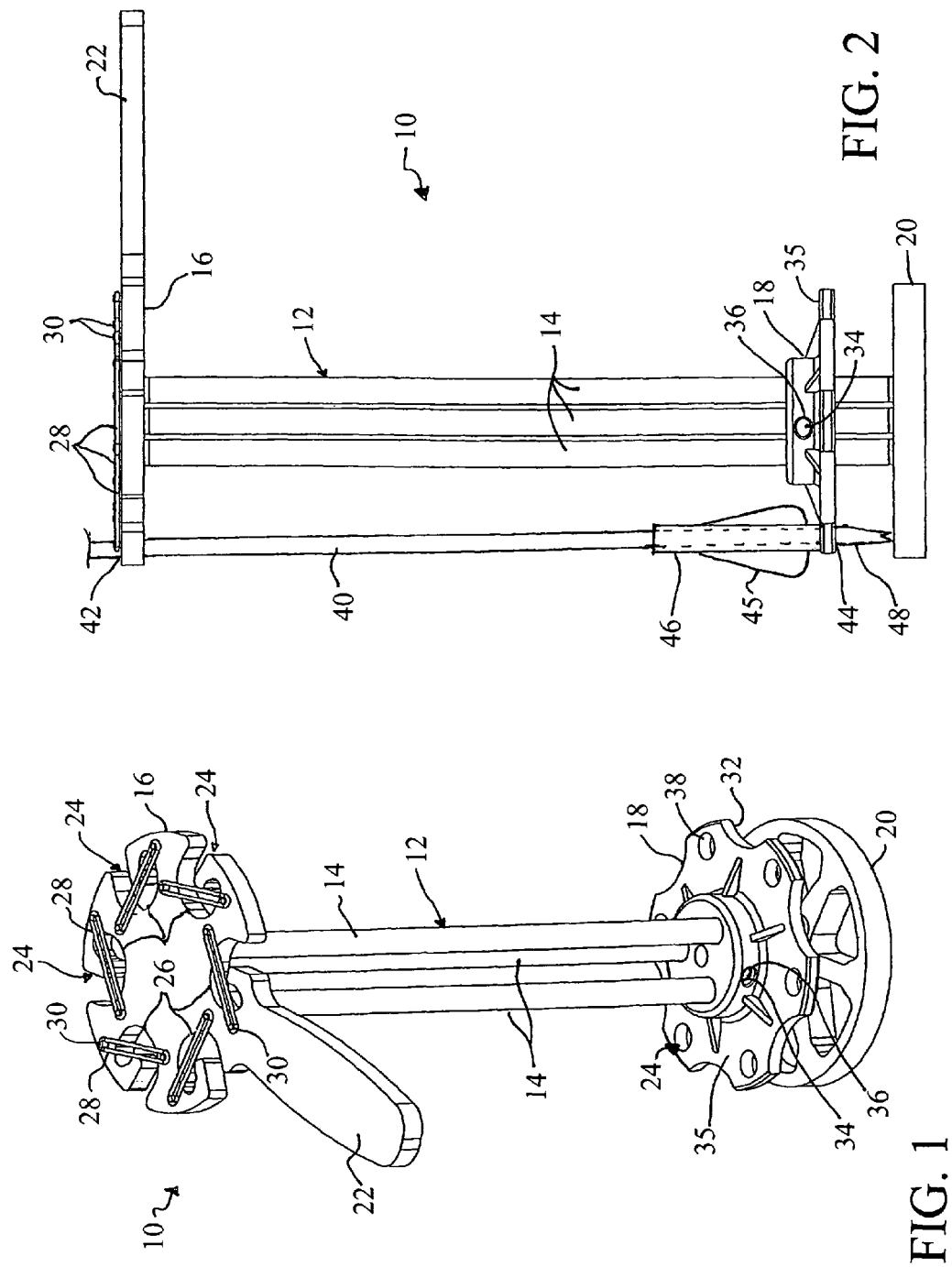

ALIGNMENT DEVICE AND METHOD FOR APPLYING SLEEVES TO ARROW SHAFTS

BACKGROUND OF THE INVENTION

1. Field of the Invention

This invention relates generally to marking or fletching an arrow and a method for attaching an arrow marking or fletching to an archery arrow shaft. More particularly, this invention relates to an apparatus and method for simultaneous registration and/or heat-shrinking of sleeves around multiple arrow shafts.

2. Discussion of Related Art

Many conventional archery arrows include fletching or archery vanes that are mounted on an arrow shaft to stabilize the flight of an archery arrow and to impart rotation on the arrow shaft during flight. The archery vanes are typically mounted directly to the arrow shaft at an aft end portion of the archery arrow using an adhesive material. Conventional fletching jigs are used to hold the arrow shaft and mount the archery vanes to the arrow shaft.

When the archery vanes are damaged, for example as a result of use, the damaged archery vanes must be replaced before the archery arrow can be used. The remaining portion of the damaged archery vane and/or the adhesive material used to mount the archery vane to the arrow shaft must be removed from the arrow shaft and the arrow shaft must be cleaned before attaching or mounting a replacement archery vane onto the arrow shaft. Further, a fletching jig is typically required to correctly position and attach the archery vanes onto the arrow shaft. Because the fletching process is time consuming and requires tools, such as a cumbersome fletching jig, hunters are not able to quickly and/or easily repair or fletch the damaged arrow in the field.

Commonly assigned U.S. Pat. No. 7,074,143 discloses an arrow fletching system including a shrinkable sleeve and archery vanes mounted to the sleeve. The sleeve can be secured about an end portion of the arrow shaft by shrinking the sleeve. This system provides an efficient fletching method in the field, at home or in a retail store. There is an apparent need for a method and apparatus for use in applying shrinkable sleeves to more than one arrow shaft at a time.

SUMMARY OF THE INVENTION

This invention provides a device and a method for aligning arrow shafts for applying a heat shrinkable sleeve simultaneously to more than one arrow shaft. Such heat shrinkable sleeves can be used to mark an arrow shaft with a color or pattern for identification purposes, or in a fletching assembly that includes a shrinkable sleeve and at least one archery vane mounted to an outer surface of the shrinkable sleeve.

A general object of the invention can be attained, at least in part, through an apparatus for holding a plurality of arrow shafts in alignment. The apparatus includes a support and at least one arrow holding assembly for holding more than one arrow shaft relative to the support. In one embodiment, a first arrow holding assembly is attached to the support for holding each of a plurality of arrow shafts at a first shaft location and a second arrow holding assembly is attached to the support a distance from the first arrow holding assembly for holding each of the plurality of arrow shafts at a second shaft location. The apparatus of this invention allows for consistent placement of shrinkable sleeves around multiple arrow shafts and simultaneous shrinking of sleeves onto multiple arrow shafts.

The invention further comprehends an apparatus for holding a plurality of arrow shafts in alignment for aligning a sleeve a distance from an end of each of the arrow shafts. The apparatus includes a central support and an arrow holding assembly attached at or toward a second end of the support for holding the plurality of arrow shafts. The arrow holding assembly comprising a plurality of arrow holders disposed about the support. The apparatus further includes an adjuster ring moveably connected to the support between the base and the arrow holding assembly. The adjuster ring includes a surface for supporting a sleeve at a predetermined position about one of the arrow shafts.

The invention still further comprehends a method of applying shrink tubes to arrow shafts. The method includes placing each of a plurality of sleeves about a corresponding one of a plurality of arrow shafts; holding each of the arrow shafts with an end of each of the arrow shafts against a flat surface; holding each of the sleeves a predetermined distance from the flat surface; and lowering the arrow shafts into a heated liquid to shrink each of the sleeves to the corresponding one of the arrow shafts.

As used herein, references herein to "arrow shaft" are to be understood to include shafts for use in various archery devices such as bows or crossbows.

Further, references to "vanes" or "fletching" are to be understood to include various types of vane materials, such as polymer materials and feathers.

Other objects and advantages will be apparent to those skilled in the art from the following detailed description taken in conjunction with the appended claims and drawings.

BRIEF DESCRIPTION OF THE DRAWINGS

FIG. 1 is a perspective view of an apparatus according to one embodiment of this invention.

FIG. 2 is a side view of the apparatus of FIG. 1.

DETAILED DESCRIPTION OF THE INVENTION

The present invention provides a device and a method for aligning several arrow shafts. The apparatus and method can be used to register and apply markings or objects to the arrow shafts, such as the sleeves and/or vanes, such as, for example, the fletching system disclosed in commonly assigned U.S. Pat. No. 7,074,143. The apparatus and method of this invention provide for consistent placement and/or efficient application of shrinkable sleeves, with or without vanes thereon, to more than one arrow shaft at one time. A sleeve is placed about each of the arrow shafts held in the device and the device can be placed into a heated liquid to simultaneously apply the sleeves to the arrow shafts.

Figure 3:
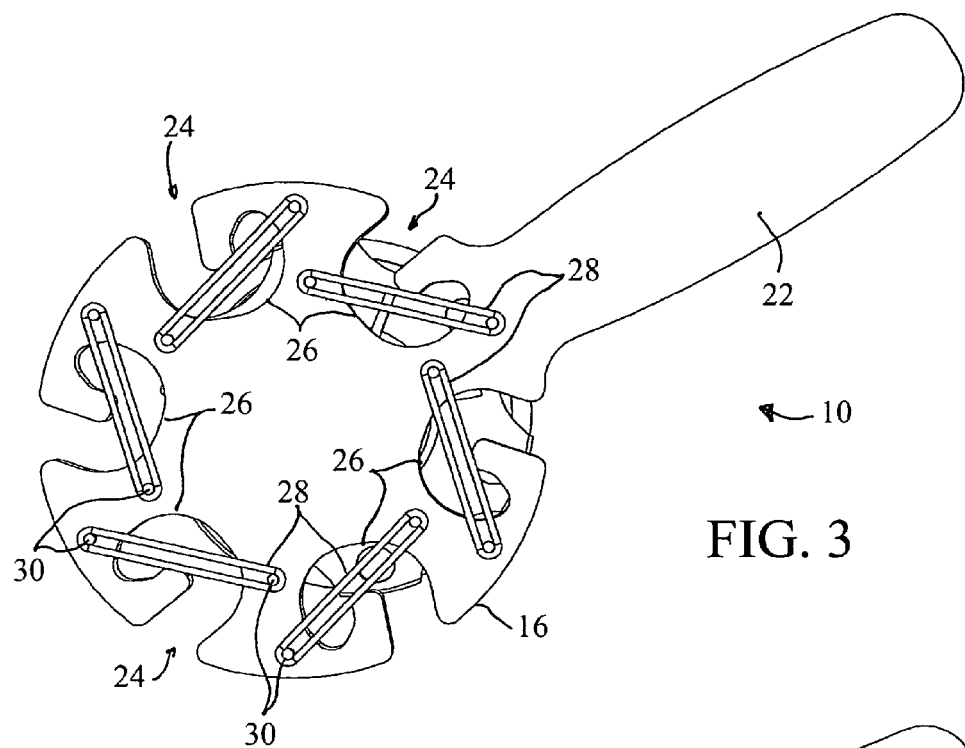
FIG. 3 is a top view of the apparatus of FIG. 1
Figure 4:
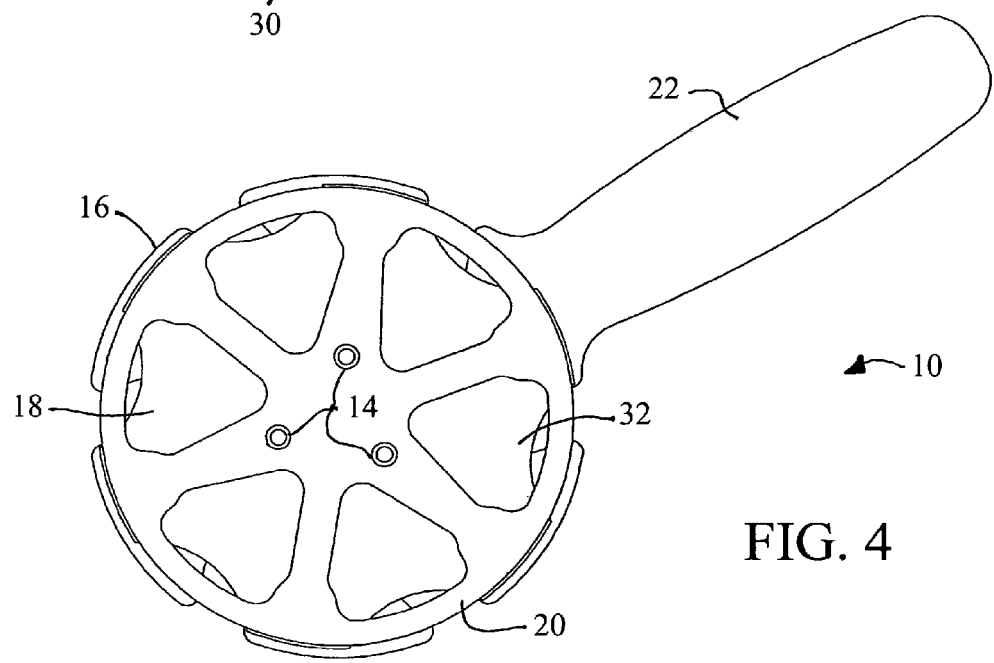
FIG. 4 is a bottom view of the apparatus of FIG. 1.

FIGS. 1-4 illustrate an arrow shaft holding apparatus 10 according to one embodiment of this invention. Holding apparatus 10 includes central support 12, two arrow holding assemblies 16 and 18, and base 20. Base 20, shown from the bottom in FIG. 4, is disposed at an end of support 12 to allow support 12 to stand vertically on base 20. Base 20 is flat or planar having a flat bottom surface shown in FIG. 4 to stand on and also a flat top surface for supporting multiple arrow shafts thereon, as shown in FIG. 2.

Referring to FIGS. 1 and 2, central support 12 is formed of three individual shafts 14 extending from base 20. Shafts 14 can be formed from metal, alloy, plastic, graphite and/or composite material or any other suitable material tubing commonly used to form arrow shafts. The use of three shafts 14 provides additional strength and stability, and also keeps the arrow holding assemblies 16 and 18 from turning about the support 12. Various and alternative sizes, shapes and configurations are available for the support 12. For example, any number of shafts 14, such as one, two or four, can be used to form support 12. Also, the support or shafts thereof can be square or another suitable shape.

First arrow holding assembly 16 is attached at an end of the support 12 that is opposite the base 20. The first arrow holding assembly 16 includes an optional handle 22 to facilitate the lifting of the apparatus 10 after loading with arrows (described further below). The first arrow holding assembly 16 includes a plurality of arrow holders 24. Referring to FIG. 2, each of the arrow holders 24 of the first arrow holding assembly 16 holds an arrow shaft 40 at a first shaft location 42. In one embodiment of this invention, each of the arrow holders includes a slot for receiving an arrow shaft and an elastic member for securing the arrow shaft within the slot. FIGS. 1 and 3 illustrate one particularly preferred embodiment of this invention, wherein the slot is a curved slot 26 having a "J"-shape. An elastic member, formed as an elastic band 28, extends between two pins 30 over a portion of slot 26. As an arrow shaft is placed into slot 26, the elastic member 28 moves to allow the arrow shaft to reach the end of slot 26. Arrow holders 24 each hold an arrow shaft in place at the end of slot 26 using the elastic retraction force of elastic members 28 against the corresponding arrow shaft 40.

Figure 5:
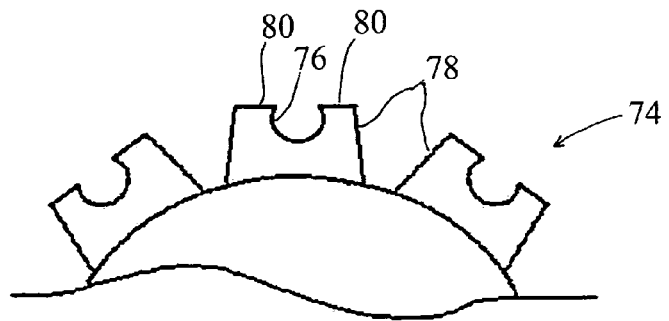
FIG. 5 is a partial view of an arrow holding assembly of another embodiment of this invention.

Other arrow shaft holding mechanisms, such as known for use in quivers, can be used in the arrow holding assemblies of this invention. FIG. 5 illustrates an alternative arrow holder according to another embodiment of this invention. FIG. 5 is a partial view of three arrow holders 74 for an arrow holding assembly of this invention. Arrow holders 74 each include a slot 26 formed in an elastic member 78 to form a grommet made of a material such as rubber. An arrow shaft inserted into slot 74 causes arms 80 of elastic member 78 to deflect outward. The retraction forces of arms 80 toward the pre-deflected position hold the shaft within slot 76. Other possible embodiments for the arrow holders of this invention include, without limitation, spring clips or holding arms biased toward the arrow shaft that is being held.

Referring to FIGS. 1 and 2, second arrow holding assembly 18 is attached to support 12 a distance from first arrow holding assembly 16 for holding each of the plurality of arrow shafts 40 at a second shaft location 44. As used herein, particularly with reference to second arrow holding assembly 18, the term "hold" or "holding" is not intended to be limited to a tight hold such as that secures the shaft portion being held in a generally locked or fixed position, but refers to a limiting of movement within an acceptable range to align and apply sleeves as discussed below.

In one embodiment of this invention, second arrow holding apparatus 18 is moveably connected to support 12 and includes arrow holders 24, such as described above. Each of arrow holders 24 of second arrow holding assembly 18 is aligned with a corresponding one of arrow holders 24 of first arrow holding assembly 16. The aligned arrow holders 24 of first and second arrow holding assemblies 16 and 18 allow for the parallel alignment of multiple arrow shafts 40, such as in the vertical position shown in FIG. 2, about support 12.

In the embodiment of FIGS. 1 and 2, second arrow holding assembly 18 is embodied as adjuster ring 32. Adjuster ring 32 is moveable along support 12 between base 20 and first arrow holding assembly 16 and fixed in place on support 12 by tightening threaded bolts 34 against support 12 through threaded openings 36. Adjuster ring 32 includes surface 35 for supporting sleeve 46 about shaft 40 a predetermined distance from the end of shaft 40. In the embodiment shown in FIGS. 1 and 3, adjuster ring 32 includes arrow holders 24 embodied as adjuster openings 38 in surface 35 and disposed equidistantly about support 12. Each adjuster opening 38 is aligned with a corresponding one of arrow holders 24 of first arrow holding assembly 16.

As shown in FIG. 2, adjuster ring 32 is used to hold sleeve 46 a distance from an end of arrow shaft 40. Adjuster ring 32 can be moved to the desired height on support 12 and ensures a consistent placement or registration of a sleeve 46 on each arrow shaft 40 placed in apparatus 10. Sleeve 46 has a diameter that is larger that arrow shaft 40 to facilitate the placement thereon. Adjuster openings 38 each have a dimension, such as a width or diameter, which is sized so that adjuster openings 38 receive one or more sizes of arrow shaft, but sized smaller than a diameter of sleeve 46 to be applied to arrow shaft 40. Sleeve 46 thus rests on top surface 35 of adjuster ring 32 adjacent to the corresponding opening 38 as shown in FIG. 2. Adjuster ring 38 supports sleeve 46 adjacent to the second shaft location 44, which in FIG. 2 is just above nock 48.

The sizes, shapes and configurations of the arrow holder assemblies, arrow holders, adjuster ring, adjuster openings, and base can vary according to need. For example, the embodiment shown in FIGS. 1-4 includes a generally cylindrical configuration with round arrow holder assemblies. The arrow holder assemblies can alternatively be generally shaped as triangles, squares, rectangles, hexagons or other polygons. The number and type of arrow holders can also vary depending on need. The illustrated embodiment includes six arrow holders, as arrows are often sold to consumers in packages of six, but the apparatus can be modified to hold more or less arrow shafts. Both arrow holding assemblies can have the same, similar or different arrow holders, such as any of the arrow holders described herein, or the configurations of the arrow holders shown in FIG. 1 for the first and second arrow holder assemblies 16 and 18 can be reversed. The base can provide a flat surface beneath the second arrow holding assembly 18 or the base can include a horizontal pin for receiving the nock and maintaining all nocks in the same position, such as the nock openings all being aligned radially with the support.

The second arrow holding assembly and/or the arrow holders thereof can also be integrated with the base so that the base secures the ends of the shafts in the apparatus. In one embodiment of this invention, the base includes a raised element or depression to secure the nock and/or a circular depression or raised element to engage the circular tube end of the arrow shaft if no nock is present. In such embodiments, the adjuster ring can include extensions radially protruding from the central support which each hold or support a sleeve about or adjacent to an arrow shaft, but have minimal or no impact on securing the arrow shaft in the apparatus. Desirably however, the surface of the adjuster ring that supports the sleeves extends about at least half of the circumference on the arrow shafts in the apparatus to reduce or eliminate the opportunity of the sleeve to fall from the adjuster ring.

In one embodiment of this invention, sleeve 46 has a generally tubular configuration or shape with an initial or pre-shrunk inner diameter greater than an outer diameter of arrow shaft 40. Preferably, sleeve 46 is shrinkable to a shrunk condition that secures sleeve 46 with respect to arrow shaft 40. For example, sleeve 46 can be secured about an outer circumference or periphery of arrow shaft 40 by applying heat to sleeve 46. In the shrunk condition, sleeve 46 has a shrunk inner diameter less than the outer diameter of arrow shaft 40, which allows sleeve 46 to maintain a tight fit to arrow shaft 40.

Sleeve 46 can comprise any suitable shrinkable material. Preferably, sleeve 46 is made of a heat shrinkable material, such as polyvinyl chloride, nylon, polytetrafluoroethylene or a polyolefin material. Additionally, sleeve 46 may be made of any suitable lightweight polymer, plastic or other material that can be secured to arrow shaft 40 using shrinking methods, including heat application, evaporation or other processes, which can cause the material to conform to the shape of arrow shaft 40. Sleeve 46 can include an adhesive applied to an inner surface to assist in holding sleeve 46 to arrow shaft 40 prior to and/or after shrinking. As shown in FIG. 2, sleeve 46 includes at least one archery vane 45, and preferably two or three vanes 45, mounted to an outer surface of sleeve 46. Preferably, archery vanes 45 are adhesively mounted to the sleeve 46. Archery vanes 45 can be mounted or attached to sleeve 46 using any suitable mounting or connecting methods. Alternatively, vanes 45 can be integrated or molded with sleeve 46.

In one embodiment of this invention, a method of applying shrink tubes to arrow shafts includes placing each of a plurality of sleeves about a corresponding one of a plurality of arrow shafts, holding each of the arrow shafts, such as in a vertical position, with an end of each of the arrow shafts against a flat surface, and holding each of the sleeves a predetermined distance from the flat surface. As discussed above, the apparatus of this invention is particularly useful in holding the arrow shafts and the sleeves according to this method.

Figure 6:
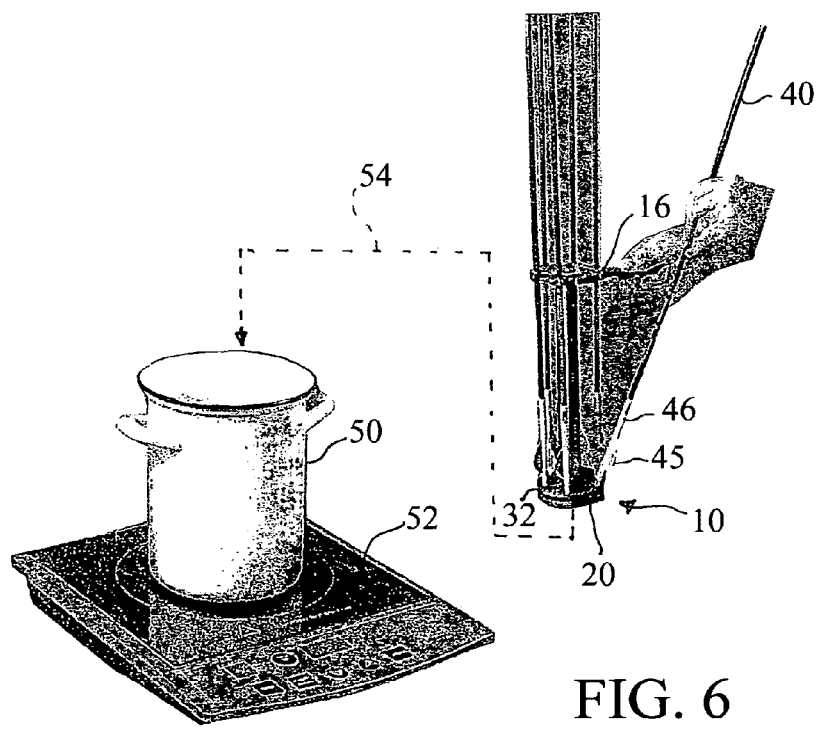
FIG. 6 illustrates an apparatus and the use of the apparatus according to an embodiment of this invention.

FIG. 6 illustrates the loading of arrow shafts having sleeves applied into the apparatus 10. The apparatus 10 is desirably placed on a flat surface such as a table. The nocks 48 of arrow shafts 40 are set into the adjuster openings 38 and lowered until the nock 48 rests on a portion of base 20 below the openings 38. The nocks 48 and sleeves 46 can be independently turned to orient the nocks 48 and vanes 45 in the desired position relative to each other. The flat surface provided by the base 20 ensures the sleeves 46 are equidistantly placed above the nock 48. Alternatively, the flat surface can be the table itself, such as in embodiments where base 20 does not extend below the openings 38. The arrow shafts 40 are placed into the upper first arrow holder assembly to be maintained in a desired vertical position with sleeves 46 held in the desired position above the shaft end, as shown in FIG. 6.

FIG. 6 further illustrates a vessel 50 adapted to receive the apparatus 10 and a heat source 52 of, or used in combination with, the apparatus according to one embodiment of this invention. The vessel 50, such as a pot, contains a heated liquid that is heated by placing vessel 50 on heat source 52. Heat source 52 can be any source suitable for heating a liquid in vessel 50. In one embodiment of this invention heat source 52 is or includes a hot plate, and preferably an induction hot plate, which provides heat without an open flame.

As indicated by dashed line 54, apparatus 10 and the arrow shafts 40 held thereby, having sleeves 46 positioned with respect to outer surface thereof, can be partially submerged, such as at least to above the sleeves, in heated or boiling liquid to cause sleeves 46 to simultaneously shrink about the outer surface of the respective arrow shaft 40 and fit securely about the arrow shafts 40. The apparatus 10 can be lifted by the handle 22 and lowered into the heated liquid. Preferably the liquid is water having a temperature greater than the shrinking point of the sleeve material. For example, if sleeve 46 includes polyvinyl chloride, the water preferably has a temperature greater than about 212° F., and if sleeve 46 includes a polyolefin material, the water preferably has a temperature greater than about 158° F., to shrink sleeve 46 about arrow shaft 40.

In one preferred embodiment of this invention, sleeve 46 has a final or shrunk wall thickness of about 0.010 inch to about 0.050 inch.

After a sufficient time to shrink the sleeves 46, the apparatus 10 is removed from the vessel 50 by grasping and lifting handle 22. The arrow shafts are removed from the device and dried, and then available for use or sale.

Thus, the invention provides an apparatus and method for applying a sleeve, with or without vanes, at a consistent placement among more than one arrow shaft. The apparatus and method further allows for simultaneous shrinking of more than one sleeve, thereby increasing the speed of which arrow shafts can be marked or fletched. The apparatus and method of this invention is useful for the consumer to apply vanes at home and in the field, and is particularly useful for retail stores that add vanes to arrow shafts for sale to customers. The apparatus and method provide quick and consistent placement of sleeves for attachment to shafts.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for holding a plurality of arrow shafts in alignment for aligning a sleeve a distance from an end of each of the arrow shafts, the apparatus comprising:
    a support;
    a first arrow holding assembly attached to the support for holding each of the plurality of arrow shafts at a first shaft location; and
    a second arrow holding assembly connected to the support a distance from the first arrow holding assembly for holding each of the plurality of arrow shafts at a second shaft location, wherein the second arrow holding assembly is moveable along the support and includes a surface facing the first arrow support for supporting a sleeve at a predetermined position about one of the arrow shafts;
    a base attached to an end of the support, the base providing a surface facing the first arrow holder and the second arrow holder and receiving a nock end of the arrow shafts; and
    each of the first arrow holding assembly and the second arrow holding apparatus comprising a plurality of arrow holders, and each of the first arrow holding assembly arrow holders is aligned with a corresponding one of the second arrow holding assembly arrow holders, wherein each of the arrow holders of the second arrow holding apparatus extends around at least a portion of a corresponding arrow shaft of the plurality of arrow shafts at the second shaft location and supports the sleeve to be applied to the one of the arrow shafts thereon and adjacent to and above the second shaft location.

2. The apparatus of claim 1, wherein each of the arrow holders of at least one of the first arrow holding assembly or the second arrow holding assembly comprises a curved slot for receiving one of the arrow shafts and an elastic member extending across the slot for securing the one of the arrow shafts in the slot.

3. The apparatus of claim 2, wherein the elastic member comprises an elastic band extending around and between a first pin on a first side of the slot and a second pin on a second side of the slot.

4. The apparatus of claim 1, wherein the second arrow holding apparatus comprises a threaded opening disposed at an angle to the support and a threaded member within the threaded opening for fixing the moveable second arrow holding device at any of more than one position on the support.

5. The apparatus of claim 1, wherein the second arrow holding apparatus comprises an adjuster ring moveably connected to the support, the adjuster ring including a plurality of circular adjuster openings each for receiving a portion of one of the plurality of arrow shafts.

6. The apparatus of claim 5, wherein each of the adjuster openings holds one of the arrow shafts at the second shaft location and supports a sleeve to be applied to the one of the arrow shafts thereon and adjacent to the second shaft location.

7. The apparatus of claim 1, wherein the second arrow holding assembly is disposed between the base and the first arrow holding assembly and the support is disposed in a vertical position when the apparatus is set on a second surface of the base.

8. The apparatus of claim 1, further comprising a vessel for containing a heated liquid, wherein the apparatus is adapted to be placed into the vessel.

9. The apparatus of claim 8, further comprising a heat source for heating the vessel.

10. The apparatus of claim 1, further comprising the sleeves for placement on the second arrow holding assembly.

11. The apparatus of claim 1, wherein each of the arrow holders of at least one of the first arrow holding assembly or the second arrow holding assembly comprises a slot having for receiving one of the arrow shafts, the slot having a first end open at an edge of the at least one of the first arrow holding assembly or the second arrow holding assembly and a second end opposite the first end, and further comprising an elastic member extending across the slot for securing the one of the arrow shafts against the second end of the slot.

12. A method of applying shrink tubes to arrow shafts, the method comprising:
    placing each of a plurality of sleeves about a corresponding one of a plurality of arrow shafts;
    holding each of the arrow shafts in an apparatus with an end of each of the arrow shafts against a flat surface;
    holding each of the sleeves with the apparatus a predetermined distance from the flat surface; and
    lowering the arrow shafts while held by the apparatus into a heated liquid to shrink each of the sleeves to the corresponding one of the arrow shafts.

13. The method of claim 12, further comprising holding each of the arrow shafts in a vertical position with a nock end of each of the arrow shafts against the flat surface.

14. The method of claim 12, further comprising securing the arrow shafts in the apparatus holding each of the plurality of arrow shafts at a first shaft location and holding each of the plurality of arrow shafts at a second shaft location.

15. The method of claim 14, wherein holding each of the sleeves comprises supporting the sleeves on a surface of a moveable adjuster ring of the apparatus.

16. The method of claim 12, wherein the flat surface comprises a surface of a base of the apparatus.

17. A method of applying shrink tubes to an arrow shaft, the method comprising:
    placing a sleeve about an arrow shaft;
    holding in an apparatus the arrow shaft with a nock end of the arrow shaft against a flat surface;
    supporting the sleeve with the apparatus a predetermined distance from the flat surface; and
    lowering the apparatus with the arrow shaft and the supported sleeve into a heated liquid to shrink the sleeve to the arrow shaft.

18. The method of claim 17, further comprising:
    placing the shaft through an opening in an adjuster ring of the apparatus; and
    supporting the sleeve on a surface of the adjuster ring in a position about the arrow shaft.

19. The method of claim 17, further comprising holding a portion of the arrow shaft in the apparatus with an elastic member.

20. The method of claim 17, further comprising inserting a portion of the shaft into a slot of the apparatus, wherein the elastic member holds the shaft against an inner end of the slot.

21. The method of claim 17, wherein the apparatus comprises a central support, an arrow holding assembly attached to the support, and an adjuster ring attached to the support between the arrow holding assembly and the flat surface, and further comprising:
    placing the shaft through an opening in an adjuster ring;
    supporting the sleeve on a surface of the adjuster ring in a position about the arrow shaft;
    securing the shaft in a slot of an arrow holding assembly with an elastic member; and
    lowering a portion of the apparatus and the arrow shaft into a heated liquid to submerge and shrink the sleeve to the arrow shaft.

* * * * *